(12) United States Patent
Udaka

(10) Patent No.: US 9,008,901 B2
(45) Date of Patent: Apr. 14, 2015

(54) BRAKE FADE DETERMINATION DEVICE, BRAKE FADE DETERMINATION METHOD AND BRAKING SYSTEM

(75) Inventor: Satoshi Udaka, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/981,009

(22) PCT Filed: Jan. 24, 2012

(86) PCT No.: PCT/IB2012/000091
§ 371 (c)(1),
(2), (4) Date: Jul. 22, 2013

(87) PCT Pub. No.: WO2012/101497
PCT Pub. Date: Aug. 2, 2012

(65) Prior Publication Data
US 2013/0304314 A1    Nov. 14, 2013

(30) Foreign Application Priority Data

Jan. 24, 2011   (JP) .................................. 2011-012299

(51) Int. Cl.
*B60T 17/22* (2006.01)
*B60T 8/1761* (2006.01)
*B60T 8/88* (2006.01)

(52) U.S. Cl.
CPC ............ *B60T 17/221* (2013.01); *B60T 8/17616* (2013.01); *B60T 8/885* (2013.01); *B60T 17/22* (2013.01); *B60T 2270/406* (2013.01)

(58) Field of Classification Search
CPC ..... B60T 8/17616; B60T 8/885; B60T 17/22; B60T 17/221; B60T 2270/406

USPC .................................. 701/34.4; 303/155, 177
See application file for complete search history.

(56) References Cited

U.S. PATENT DOCUMENTS

| | | | |
|---|---|---|---|
| 8,239,112 B2 * | 8/2012 | Joyce .............................. | 701/83 |
| 2007/0216222 A1 * | 9/2007 | Miyazaki et al. ............. | 303/155 |

FOREIGN PATENT DOCUMENTS

| | | |
|---|---|---|
| EP | 1 834 853 | 9/2007 |
| JP | 2001 206218 | 7/2001 |
| JP | 2007 015494 | 1/2007 |
| JP | 2007 083960 | 4/2007 |

(Continued)

OTHER PUBLICATIONS

International Serach Report Issued Jul. 11, 2012 in PCT/IB12/000091 Filed Jan. 24, 2012.

*Primary Examiner* — Mary Cheung
*Assistant Examiner* — Brian P Sweeney
(74) *Attorney, Agent, or Firm* — Oblon, McClelland, Maier & Neustadt, L.L.P.

(57) ABSTRACT

A brake fade determination device determines whether a fade state of a brake device that brakes a wheel of a vehicle is occurring on the basis of the deceleration of the vehicle and the slip amount of the wheel. A braking system includes: the brake device that is able to adjust a braking force that acts on the wheel of the vehicle; and a controller that controls the braking force to control the slip condition of the wheel. The controller determines whether a fade state of the brake device is occurring on the basis of the deceleration of the vehicle and the slip amount of the wheel, and adjusts the amount of increase or decrease in braking force on the basis of whether the fade state is occurring.

17 Claims, 5 Drawing Sheets

(56) References Cited

FOREIGN PATENT DOCUMENTS

| | | | |
|---|---|---|---|
| JP | 2007 237899 | 9/2007 | |
| JP | 2008 132984 | 6/2008 | |
| JP | 2008 174114 | 7/2008 | |
| JP | 2008 1744114 | * 7/2008 | ................ B60T 8/00 |

* cited by examiner

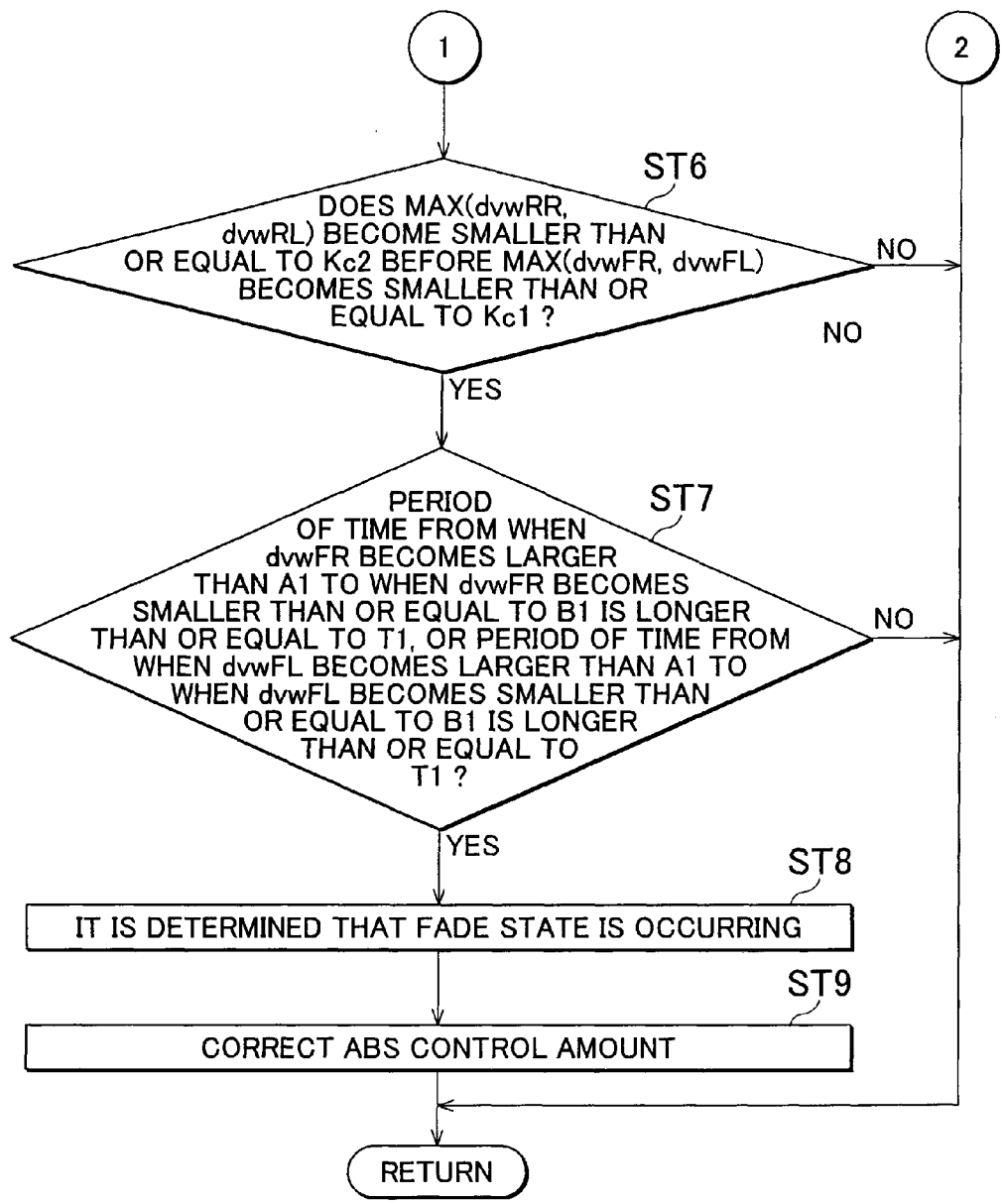

F I G . 4

|  | NON-FADE | FADE |
|---|---|---|
| LVW | REMOVED IN ST3 | INTENDED DETERMINATION REGION ST6 AND ST7 |
| GVW | REMOVED IN ST4 AND ST5 | |

BRAKE FADE DETERMINATION DEVICE, BRAKE FADE DETERMINATION METHOD AND BRAKING SYSTEM

BACKGROUND OF THE INVENTION

1. Field of the Invention

The invention relates to a brake fade determination device, a brake fade determination method and a braking system.

2. Description of Related Art

Japanese Patent Application Publication No. 2001-206218 (JP-A-2001-206218) describes a brake fade warning device as a device that determines whether a fade state of a braking system used in a vehicle is occurring. The brake fade warning device determines whether a fade state of a brake is occurring on the basis of the difference between a target deceleration and an actual deceleration. The brake fade warning device determines that a brake fade may be occurring when the actual deceleration is smaller than the target deceleration and the difference between the actual deceleration and the target deceleration is larger than or equal to a predetermined value, and then prompts a driver to pay attention.

Incidentally, the above brake fade warning device described in JP-A-2001-206218 has room for improvement in terms of, for example, a determination as to whether a fade state is occurring.

SUMMARY OF THE INVENTION

The invention provides a brake fade determination device, brake fade determination method and braking system that are able to properly determine whether a fade state of a brake device is occurring.

An aspect of the invention relates to a brake fade determination device. The brake fade determination device determines whether a fade state of a brake device that brakes a wheel of a vehicle is occurring on the basis of a deceleration of the vehicle and a slip amount of the wheel of the vehicle.

In addition, the brake fade determination device may determine whether the fade state is occurring when an operation amount for braking the vehicle is larger than or equal to a predetermined operation amount and the an operation speed for baking the vehicle is higher than a predetermined operation speed.

In addition, the brake fade determination device may determine that the fade state is occurring in the case where the slip amount of a front wheel of the vehicle is smaller than or equal to a predetermined slip amount when the deceleration of the vehicle is a first predetermined deceleration.

In addition, the brake fade determination device may determine that the fade state is occurring when the deceleration of the vehicle at the time when a braking force by which a front wheel of the vehicle locks acts on the front wheel is larger than or equal to a second predetermined deceleration.

In addition, the brake fade determination device may determine that the fade state is occurring when the deceleration of the vehicle at the time when a braking force by which a rear wheel of the vehicle locks acts on the rear wheel is smaller than or equal to a third predetermined deceleration.

In addition, the brake fade determination device may determine that the fade state is occurring when a braking force by which a rear wheel of the vehicle locks has been already acting on the rear wheel at the time when a braking force by which a front wheel of the vehicle locks acts on the front wheel.

In addition, the brake fade determination device may determine that the fade state is occurring when a wheel speed variation of a front wheel of the vehicle is smaller than or equal to a predetermined variation.

In addition, the brake fade determination device may determine that the fade state is occurring when a period of time from when braking operation of which the operation amount for braking the vehicle is larger than or equal to the predetermined operation amount is performed to when ABS control is activated is longer than or equal to a predetermined period of time.

Another aspect of the invention relates to a brake fade determination method. The brake fade determination method includes: determining whether a fade state of a brake device that brakes a wheel of a vehicle is occurring on the basis of a deceleration of the vehicle and a slip amount of the wheel of the vehicle.

Further another aspect of the invention relates to a braking system. The braking system includes: a brake device that is able to adjust a braking force that acts on a wheel of a vehicle; and a controller that controls the braking force to control a slip condition of the wheel, wherein the controller determines whether a fade state of the brake device is occurring on the basis of a deceleration of the vehicle and a slip amount of the wheel, and adjusts an amount of increase or decrease in the braking force on the basis of whether the fade state is occurring.

With the brake fade determination device, brake fade determination method and braking system according to the aspects of the invention, it is advantageously possible to properly determine whether a fade state of the brake device is occurring.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a conceptual diagram that illustrates isolation of a fade state.

DETAILED DESCRIPTION OF EMBODIMENTS

Hereinafter, an embodiment of the invention will be described in detail with reference to the accompanying drawings. Note that the aspects of the invention are not limited by the embodiment. In addition, components in the embodiment described below include components that are easily replaceable by a person skilled in the art or substantially equivalent components.

Embodiment

Figure 1:
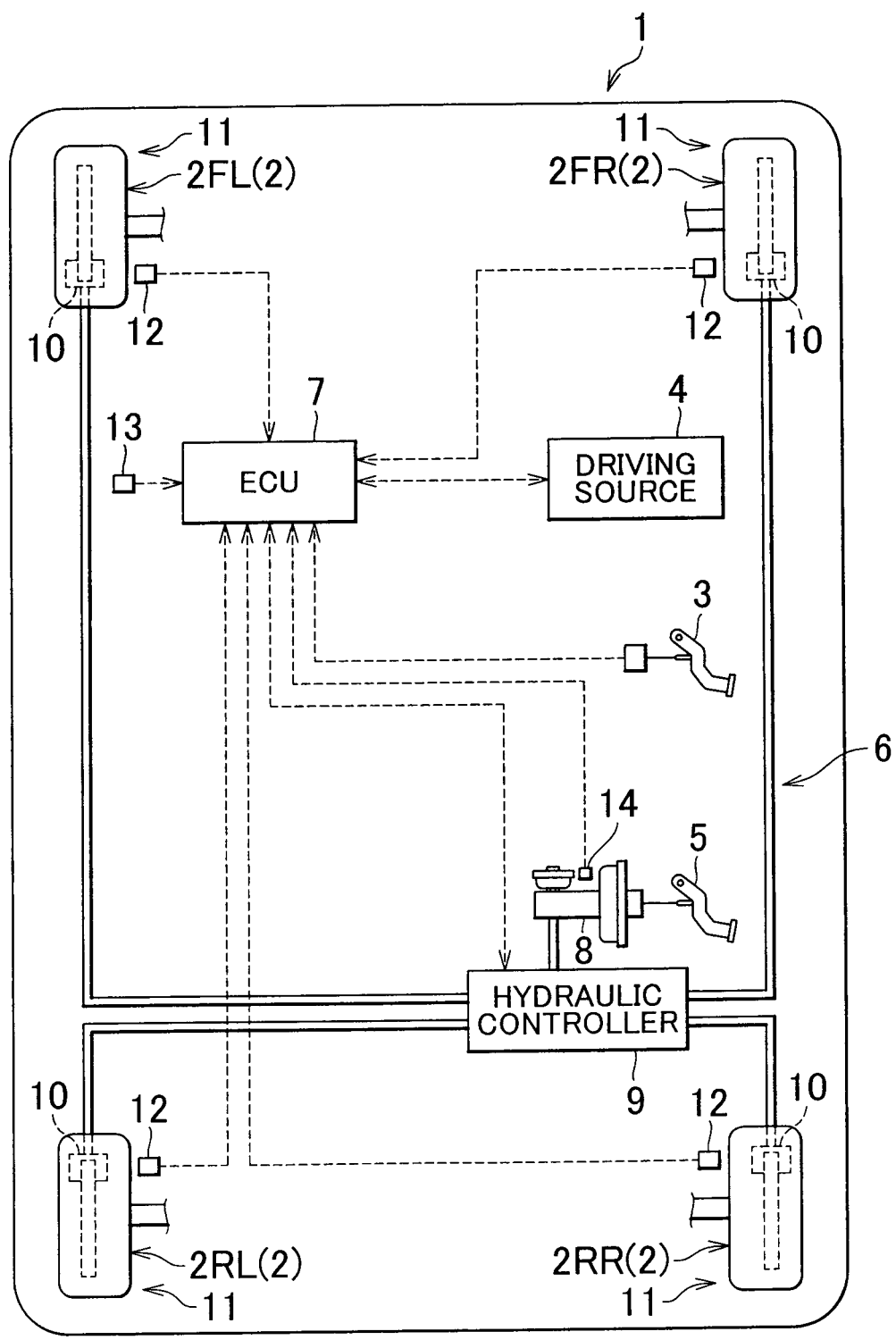
FIG. 1 is a schematic configuration diagram of a vehicle according to an embodiment.
Figure 2:
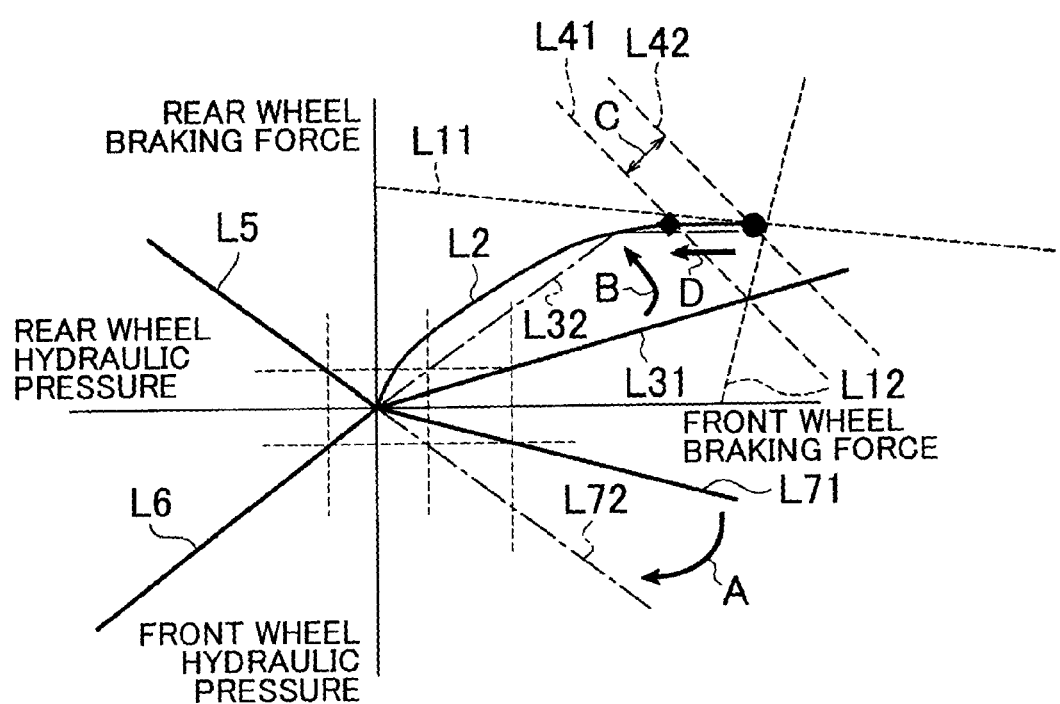
FIG. 2 is a braking force distribution line map.
Figure 3A:
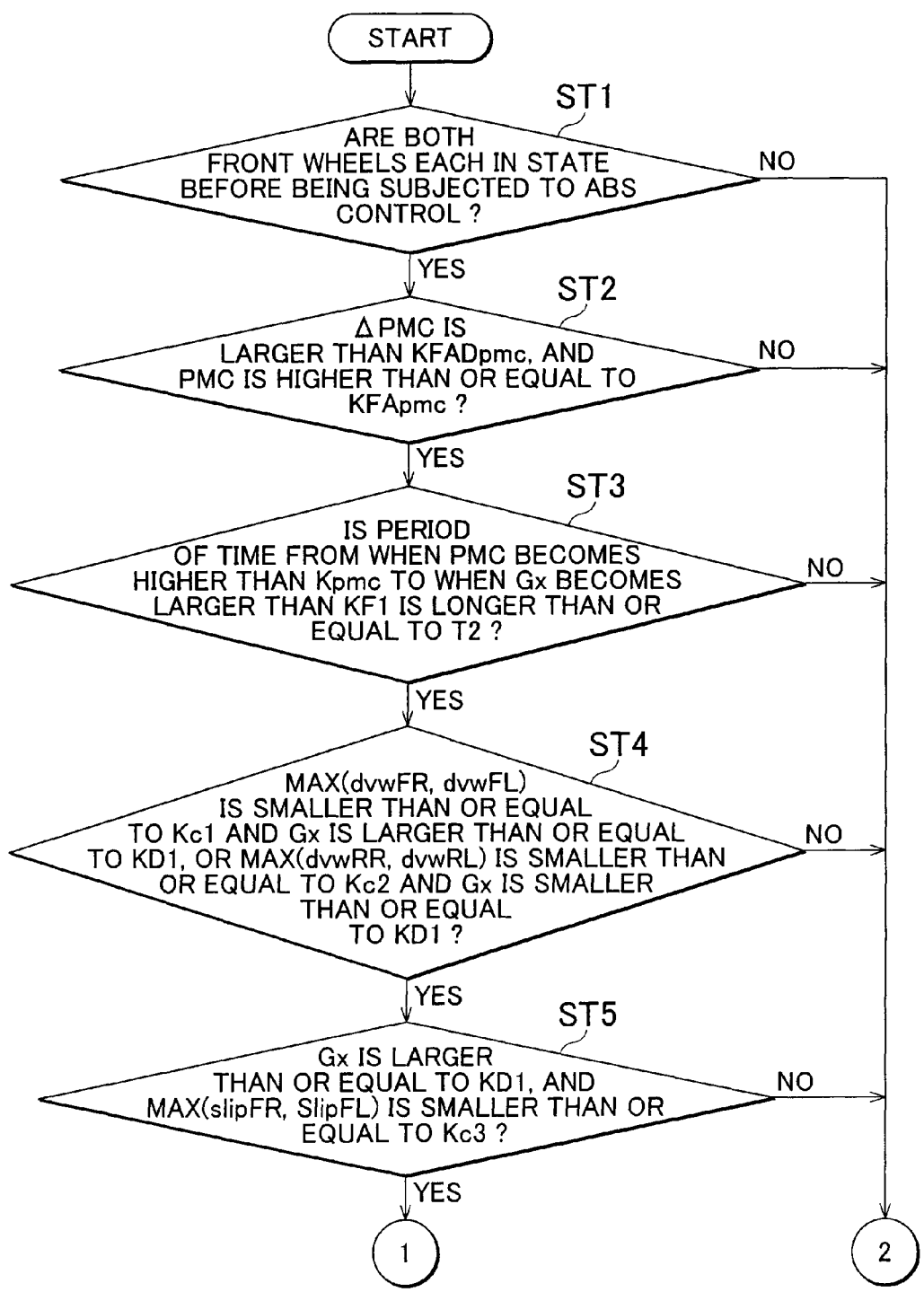
FIG. 3 is a flow chart that illustrates an example of control executed by an ECU.

FIG. 1 is a schematic configuration diagram of a vehicle according to the embodiment. FIG. 2 is a braking force distribution line map. FIG. 3 is a flow chart that illustrates an example of control executed by an ECU. FIG. 4 is a conceptual diagram that illustrates isolation of a fade state.

The present embodiment typically includes the following components.
(1) wheel speed sensors for four wheels
(2) a hydraulic sensor that determines a braking operation amount
(3) an ECU that computes a pressure rising gradient (differential value of hydraulic pressure)
(4) a vehicle body speed sensor or a mechanism and logical means for estimating a vehicle body speed
(5) an ECU that measures the differential value of each wheel speed (wheel acceleration) and each wheel speed
(6) a vehicle body deceleration sensor or a logical means that calculates a vehicle body deceleration
(7) a logical means that determines sudden braking and strong braking
(8) a logical means that recognizes a period of time from a start of braking to when the deceleration exceeds a selected value
(9) a logical means that recognizes the gradient of a variation in each wheel acceleration
(10) an actuator that is able to achieve ABS function Then, in the present embodiment, these components are used to make it possible to properly determine the fade state of each brake device by, for example, effectively utilizing detected results (master cylinder pressure, vehicle body deceleration, wheel speeds), or the like, of sensors to be used to perform control that are equipped for a so-called vehicle stability control (VSC) system. By so doing, for example, the efficiency of ABS in a fade state is improved to thereby make it possible to reduce a distance required to stop the vehicle (stopping distance).

Specifically, an ECU 7 that serves as a brake fade determination device according to the present embodiment is installed in a vehicle 1 as shown in FIG. 1. The vehicle 1 includes a front left wheel 2FL, a front right wheel 2FR, a rear left wheel 2RL, and a rear right wheel 2RR as wheels 2. The vehicle 1 includes an accelerator pedal 3, a driving power source 4, a brake pedal 5, a braking system 6, the ECU 7, etc. The ECU 7 serves as a controller. In the vehicle 1, the driving power source 4 generates power (torque) in response to a driver's operation of the accelerator pedal 3, and the power is transmitted to the wheels 2 via a power transmission device (not shown) to thereby cause the wheels 2 to generate driving force. In addition, in the vehicle 1, the braking system 6 is activated in response to a driver's operation of the brake pedal 5 to thereby cause the wheels 2 to generate braking force. The ECU 7 according to the present embodiment is used as both the brake fade determination device and the controller of the braking system 6.

The driving power source 4 is a power source, such as an internal combustion engine and an electric motor. The braking system 6 is any one of various known hydraulic braking systems in which a hydraulic passage that connects the master cylinder 8 to wheel cylinders 10 via a hydraulic controller (hydraulic actuator) 9 is filled with brake fluid that serves as working fluid. In the braking system 6, basically, as the driver operates the brake pedal 5, master cylinder pressure (operating pressure) is applied to brake fluid by the master cylinder 8 in response to pedal depression force (operating force) that acts on the brake pedal 5. Then, in the braking system 6, the master cylinder pressure acts in each wheel cylinder 10 as wheel cylinder pressure (braking pressure) to actuate a corresponding one of hydraulic brake devices 11 to cause pressure braking force to act on the associated wheel 2. Each hydraulic brake device 11 is formed of a caliper, brake pads, a disc rotor, etc. In each brake device 11, the brake pads are brought into contact with and pressed against the disc rotor to cause predetermined rotational resistance force corresponding to wheel cylinder pressure to act on the disc rotor that rotates with the corresponding wheel 2 to thereby make it possible to apply braking force to the disc rotor and the wheel 2 that rotates integrally with the disc rotor. During this, in the braking system 6, the wheel cylinder pressure is appropriately regulated by the hydraulic controller 9 on the basis of a driving condition. Note that the master cylinder 8 generates master cylinder pressure in response to a braking operation, that is, a brake operation, performed on the brake pedal 5, and the master cylinder pressure corresponds to an operation amount of a driver's braking operation performed on the brake pedal 5.

The ECU 7 executes drive control over various components of the vehicle 1. The ECU 7 includes an electronic circuit. The electronic circuit is mainly formed of a known microcomputer that includes a CPU, a ROM, a RAM and an interface. Various sensors and detectors are attached to various portions of the vehicle 1, and include wheel speed sensors 12, a longitudinal acceleration sensor 13, a master cylinder pressure sensor 14, etc. Each of the wheel speed sensors 12 detects the rotation speed of a corresponding one of the wheels 2. The longitudinal acceleration sensor 13 detects the acceleration of the body of the vehicle 1 in the longitudinal direction (travelling direction) thereof. The master cylinder pressure sensor 14 detects the master cylinder pressure. These various sensors and detectors are, for example, electrically connected to the ECU 7, and electrical signals corresponding to detected results are input to the ECU 7. The ECU 7 executes a stored control program on the basis of various input signals input from the various sensors and various maps to output driving signals to the various components of the vehicle 1, such as the driving power source 4 and the hydraulic controller 9 of the braking system 6, to thereby execute drive control over these components.

Here, the hydraulic controller 9 includes, for example, a plurality of lines, an oil reservoir, an oil pump, hydraulic lines connected to the wheel cylinders 10 respectively provided for the wheels 2, a plurality of electromagnetic valves for respectively increasing, decreasing or holding the hydraulic pressures of the hydraulic lines, etc. The hydraulic controller 9 is controlled by the ECU 7. During normal operation, the hydraulic controller 9 is able to regulate wheel cylinder pressures that respectively act on the wheel cylinders 10 according to the driver's operation amount (depression amount) of the brake pedal 5 by, for example, driving the oil pump and the predetermined electromagnetic valves in accordance with a control command from the ECU 7. In addition, during vehicle control (described later), the hydraulic controller 9 is able to be activated in a pressure increasing mode, a pressure holding mode, a pressure decreasing mode, or the like, by, for example, driving the oil pump and the predetermined electromagnetic valves in accordance with a control command from the ECU 7. In the pressure increasing mode, the wheel cylinder pressures that respectively act on the wheel cylinders 10 are increased. In the pressure holding mode, the wheel cylinder pressures are kept substantially constant. In the pressure decreasing mode, the wheel cylinder pressures are decreased. The hydraulic controller 9 is able to set any one of the above modes independently for the wheel cylinders 10 of the brake devices 11 respectively provided for the wheels 2 on the basis of the driving condition of the vehicle 1 through control of the ECU 7.

Then, the ECU 7 according to the present embodiment controls the driving power source 4 and the hydraulic controller 9 on the basis of the driving condition of the vehicle 1 to thereby make it possible to achieve the antilock brake system (ABS) function, traction control system (TRC) function, etc., of the vehicle 1. That is, when at least any one of the wheels 2 slips with a driver's depressing operation of the accelerator pedal 3 (acceleration operation) or a driver's depressing operation of the brake pedal 5 (braking operation), the ECU 7 adjusts the braking/driving force of the wheel 2 in a slip condition to thereby apply optimal braking/driving force based on the driving condition of the vehicle 1 to that wheel 2. The ECU 7 adjusts the output power of the driving power source 4 or the wheel cylinder pressure (hereinafter, also referred to as "brake pressure" where appropriate) as the braking pressure of each brake device 11 and then controls braking/driving force that acts on each wheel 2 to thereby control the slip condition of each wheel 2, for example, the slip ratio of each wheel 2. The slip ratio is an index that indicates a slip between the tire of each wheel 2 and a road surface.

For example, the ECU 7 executes the above slip ratio control as braking force control (ABS control) at the time when the ABS function is activated in order to suppress a slip that can occur between the wheels 2 and a road surface when the braking system 6 is activated in response to a driver's depressing operation of the brake pedal 5. In this case, the ECU 7 adjusts the brake pressure of each brake device 11 such that an actual slip ratio coincides with a target slip ratio to thereby control a braking force that acts on each wheel 2. The ECU 7 decreases the brake pressure to reduce the braking force when an actual slip ratio is larger than the target slip ratio, and increases the brake pressure to increase the braking force when an actual slip ratio is smaller than the target slip ratio. The ECU 7 is able to reduce the braking distance of the vehicle 1 and is able to improve vehicle stability and steerability while making it possible to prevent a brake lock by periodically repeating the above control.

Then, the ECU 7 according to the present embodiment determines whether the fade state of each brake device 11 that brakes a corresponding one of the wheels 2 is occurring on the basis of the deceleration of the vehicle 1 and the slip amount of the corresponding one of the wheels 2 to thereby properly determine whether the fade state of each brake device 11 is occurring.

Here, the fade state of the brake device 11 is a state in which brake fade is occurring. In the brake fade, the friction coefficient between the brake pads and disc rotor of the brake device 11 decreases and, therefore, the braking force (braking torque) that acts on the brake device 11 decreases. The brake fade of the brake device 11 may, for example, occur because of an overheat or rust of the friction material of the brake device 11, adhesion of snow, or the like.

Here, the feature at the time of the fade state of each of the brake devices 11 of the front wheels 2FL and 2FR will be described with reference to the braking force distribution line map shown in FIG. 2. In FIG. 2, the first quadrant shows the correspondence relationship between a front wheel braking force and a rear wheel braking force (front wheel braking force/rear wheel braking force). The dotted straight line L11 is a rear lock limit line L11. The dotted straight line L12 is a front lock limit line L12. The rear lock limit line L11 indicates the distribution of the front wheel braking force and the rear wheel braking force at which ABS control is carried out over the rear wheels 2RL and 2RR, and typically shows an example of the distribution of a limit braking force (lock braking force) at which the rear wheels 2RL and 2RR lock. The front lock limit line L12 indicates the distribution of the front wheel braking force and the rear wheel braking force at which ABS control is carried out over the front wheels 2FL and 2FR, and typically shows an example of the distribution of a limit braking force (lock braking force) at which the front wheels 2FL and 2FR lock. The solid curved line L2 is an ideal braking force distribution line L2. The ideal braking force distribution line L2 indicates the ideal distribution of the front wheel braking force and the rear wheel braking force at which the maximum deceleration can be generated in consideration of a load transfer from the rear side (rear wheel side) to the front side (front wheel side) at the time when a deceleration is applied to the body of the vehicle 1, and typically indicates a limit braking force distribution at which the slip ratios of the front wheels 2FL and 2FR and the slip ratios of the rear wheels 2RL and 2RR are equalized and the four wheels lock at the same time (that is, the braking force distribution at the intersection of the rear lock limit line L11 and the front lock limit line L12). The solid straight line L31 and the alternate long and short dash straight line L32 are actual braking force distribution lines L31 and L32. The actual braking force distribution lines L31 and L32 show examples of actual distributions of the front wheel braking force and the rear wheel braking force. The actual braking force distribution lines L31 and L32 are typically placed on the inner side (front side) of the ideal braking force distribution line L2, and are set such that the front wheels 2FL and 2FR lock before the rear wheels 2RL and 2RR. The dotted straight lines L41 and L42 are constant deceleration lines L41 and L42. The constant deceleration lines L41 and L42 show examples of distribution combinations of the front wheel braking force and the rear wheel braking force at which a constant deceleration is applied to the vehicle 1.

In FIG. 2, the second quadrant shows the correspondence relationship between a rear wheel hydraulic pressure (the brake pressure of each rear wheel) and a rear wheel braking force (rear wheel hydraulic pressure/rear wheel braking force), and the solid straight line L5 indicates an example of the correlation between a rear wheel hydraulic pressure and a rear wheel braking force. The third quadrant shows the correspondence relationship between a rear wheel hydraulic pressure and a front wheel hydraulic pressure (the brake pressure of each front wheel) (rear wheel hydraulic pressure/ front wheel hydraulic pressure), and the solid straight line L6 indicates an example of the correlation between a rear wheel hydraulic pressure and a front wheel hydraulic pressure. The solid straight line L6 is a straight line based on the master cylinder pressure. The fourth quadrant shows the correspondence relationship between a front wheel hydraulic pressure and a front wheel braking force (front wheel hydraulic pressure/front wheel braking force), and the solid straight line L71 and the alternate long and short dash straight line L72 indicate examples of the correlation between a front wheel hydraulic pressure and a front wheel braking force.

For example, when braking operation is performed by the driver by a relatively large operation amount or at a relatively high operation speed and then a fade state of the brake devices 11 of the front wheels 2FL and 2FR has occurred, the front-side brake devices 11 become less effective because of the brake fade of the front wheels 2FL and 2FR, and the front wheel braking force generated by an equivalent front wheel hydraulic pressure decreases, so, as indicated by the arrow A in FIG. 2, the correlation between a front wheel hydraulic pressure and a front wheel braking force varies from the solid straight line L71 toward the alternate long and short dash straight line L72. At this time, the magnitude of the rear wheel braking force for the equivalent rear wheel hydraulic pressure does not substantially vary, so the correlation between a rear wheel hydraulic pressure and a rear wheel braking force is maintained as the solid straight line L5. Therefore, an actual braking force distribution for an equivalent master cylinder pressure based on a driver's operation amount varies toward the rear side such that the allocation of the rear wheel braking force relatively increases as indicated by the arrow B in FIG. 2, and, for example, varies from the actual braking force distribution line L31 toward the actual braking force distribution line L32.

As described above, the ECU 7 utilizes a characteristic change that an actual braking force distribution to the rear side increases when a fade state of the brake devices 11 of the front wheels 2FL and 2FR occurs to determine whether a fade state of the brake devices 11 is occurring, typically, a fade state of the brake devices 11 of the front wheels 2FL and 2FR is occurring, thus identifying that a fade state is occurring.

Here, the ECU 7 determines various characteristic changes on the precondition of sudden braking in a strong braking state where the operation amount of driver's braking operation reaches an operation amount at which the ABSs of the four wheels can be activated at the same time in a non-fade condition. Typically, the ECU 7 determines that a fade state of the brake devices 11 is occurring when the operation amount for braking the vehicle 1 is larger than a predetermined operation amount and the operation speed for braking the vehicle 1 is higher than a predetermined operation speed. The ECU 7 acquires a master cylinder pressure PMC as the braking operation amount on the basis of the detected result of the master cylinder pressure sensor 14, and computes the variation speed of the master cylinder pressure PMC, for example, a master cylinder pressure differential value ΔPMC, as the braking operation speed on the basis of the acquired master cylinder pressure PMC. The ECU 7 determines that a fade state of the brake devices 11 is occurring when the master cylinder pressure PMC is higher than or equal to a predetermined operation amount KFApmc and the master cylinder pressure differential value ΔPMC is larger than a predetermined operation speed KFADpmc. The predetermined operation amount KFApmc and the predetermined operation speed KFADpmc are preset and stored in a storage unit on the basis of the specifications of various components of the vehicle 1, the braking force distribution line map, an actual vehicle evaluation, etc. For example, the predetermined operation amount KFApmc is set on the basis of an operation amount at which the ABSs of the four wheels may be activated at the same time, and the predetermined operation speed KFADpmc is set so as to be able to detect a driver's sudden braking operation. By so doing, the ECU 7 is able to detect various characteristic changes in a driver's strong braking and sudden braking state and to accurately determine that a fade state of the brake devices 11 is occurring as distinguished from, for example, the case where the driver performs braking operation slowly.

Then, the ECU 7 determines whether the slip amount of each of the front wheels 2FL and 2FR at a predetermined deceleration has decreased as a determination as to a characteristic change resulting from an increase in the braking force distribution to the rear side. Typically, the ECU 7 determines that a fade state of the brake devices 11 of the front wheels 2FL and 2FR is occurring in the case where the slip amounts slipFL and slipFR of the front wheels 2FL and 2FR of the vehicle 1 each are smaller than or equal to a predetermined slip amount Kc3 when the deceleration Gx of the vehicle 1 is a predetermined deceleration KD1 that is a first predetermined deceleration. The predetermined deceleration KD1 and the predetermined slip amount Kc3 are preset and stored in the storage unit on the basis of the specifications of various components of the vehicle 1, the braking force distribution line map, an actual vehicle evaluation, etc. The ECU 7 acquires the deceleration Gx on the basis of the detected result of the longitudinal acceleration sensor 13. The ECU 7 computes the slip amounts slipFL and slipFR of the front wheels 2FL and 2FR on the basis of the detected results of the respective wheel speed sensors 12. The slip amounts slipFL and slipFR are indices that indicate a slip between the front wheels 2FL and 2FR and a road surface. The ECU 7, for example, just needs to calculate the slip amounts slipFL and slipFR (=vehicle body speed−front wheel speed) on the basis of the wheel speed of each wheel 2, detected by the corresponding wheel speed sensor 12, the vehicle body speed of the vehicle 1, estimated from the mean value of the wheel speeds of the wheels 2, etc. In addition, the ECU 7 may calculate the slip ratios of the front wheels 2FL and 2FR (=(vehicle body speed−front wheel speed)/vehicle body speed) and then may use the slip ratios as values corresponding to the slip amounts slipFL and slipFR, or may calculate front and rear wheel speed differences (=front wheel speed−rear wheel speed) and then may use the front and rear wheel speed differences as values corresponding to the slip amounts slipFL and slipFR.

For example, it is assumed that the intersection of the actual braking force distribution line L31 and the front lock limit line L12 is placed on a predetermined deceleration, for example, the constant deceleration line L41. In this state, as a fade state of the brake devices 11 of the front wheels 2FL and 2FR occurs and the actual braking force distribution to the rear side increases, the actual braking force distribution line L31 shifts to the actual braking force distribution line L32. As a result, as indicated by the arrow C in FIG. 2, the intersection of the actual braking force distribution line L32 and the front lock limit line L12 moves onto the constant deceleration line L42 having a larger deceleration than the constant deceleration line L41. In other words, as indicated by the arrow D in FIG. 2, the intersection of the actual braking force distribution line L32 and the constant deceleration line L41 is placed away from the front lock limit line L12. Therefore, even at a deceleration (constant deceleration line L41) at which a lock braking force is reached in the case where the actual braking force distribution is on the actual braking force distribution line L31, in a state where the actual braking force distribution line L31 shifts to the actual braking force distribution line L32, the front wheel braking force that can give the equivalent deceleration (constant deceleration line L41) has not reached a lock braking force, that is, there is an allowance for the front wheel braking force with respect to the front lock limit line L12. As a result, the slip amounts slipFL and slipFR of the front wheels 2FL and 2FR are relatively small. Thus, the ECU 7 is able to determine that a fade state of the brake devices 11 of the front wheels 2FL and 2FR is occurring in the case where the slip amounts slipFL and slipFR of the front wheels 2FL and 2FR of the vehicle 1 each are smaller than or equal to the predetermined slip amount Kc3 when the deceleration Gx of the vehicle 1 is the predetermined deceleration KD1.

In addition, the ECU 7 further determines whether the deceleration that occurs when the lock braking force acts on the front wheels 2FL and 2FR has increased and determines whether the deceleration that occurs when the lock braking force acts on the rear wheels 2RL and 2RR has decreased, as a determination as to a characteristic change resulting from an increase in the braking force distribution to the rear side. Typically, the ECU 7 determines that a fade state of the brake devices 11 of the front wheels 2FL and 2FR is occurring when the deceleration Gx of the vehicle 1 at the time when the braking force by which the front wheels 2FL and 2FR lock acts on the front wheels 2FL and 2FR of the vehicle 1 is larger than or equal to the predetermined deceleration KD1 that is a second predetermined deceleration or when the deceleration Gx of the vehicle 1 at the time when the braking force by which the rear wheels 2RL and 2RR lock acts on the rear wheels 2RL and 2RR of the vehicle 1 is smaller than or equal to the predetermined deceleration KD1 that is a third predetermined deceleration. For example, the ECU 7 calculates the differential values of the wheels speeds of the front wheels 2FL and 2FR and rear wheels 2RL and 2RR of the vehicle 1 on the basis of the detected results of the wheel speed sensors 12 and uses these differential values as wheel accelerations dvwFL, dvwFR, dvwRL and dvwRR. Then, the ECU 7 just needs to determine whether the braking force by which any one of the front wheels 2FL and 2FR and the rear wheels 2RL and 2RR locks has acted on the front wheels 2FL and 2FR and the rear wheels 2RL and 2RR on the basis of whether any one of the wheel accelerations dvwFL and dvwFR is smaller than or equal to a predetermined acceleration Kc1 or whether any one of the wheel accelerations dvwRL and dvwRR is smaller than or equal to a predetermined acceleration Kc2. The predetermined deceleration KD1 and the predetermined accelerations Kc1 and Kc2 are preset and stored in the storage unit on the basis of the specifications of various components of the vehicle 1, the braking force distribution line map, an actual vehicle evaluation, etc. For example, the predetermined accelerations Kc1 and Kc2 are set so as to be able to detect a lock of any one of the front wheels 2FL and 2FR and rear wheels 2RL and 2RR. Note that, here, the first predetermined deceleration, the second predetermined deceleration and the third predetermined deceleration are set at the same predetermined deceleration KD1; however, the first predetermined deceleration, the second predetermined deceleration and the third predetermined deceleration may be different values where appropriate.

As described above, as a fade state of the brake devices 11 of the front wheels 2FL and 2FR occurs and the actual braking force distribution to the rear side increases, the actual braking force distribution line L31 shifts to the actual braking force distribution line L32. As a result, the deceleration at the time when the front wheel braking force reaches the front lock limit line L12 increases, and the deceleration at the time when the rear wheel braking force reaches the rear lock limit line L11 decreases. Thus, the ECU 7 is able to determine that a fade state of the brake devices 11 of the front wheels 2FL and 2FR is occurring when the deceleration Gx of the vehicle 1 at the time when the lock braking force acts on the front wheels 2FL and 2FR is larger than or equal to the predetermined deceleration KD1 or when the deceleration Gx of the vehicle 1 at the time when the lock braking force acts on the rear wheels 2RL and 2RR is smaller than or equal to the predetermined deceleration KD1.

In addition, the ECU 7 may further determine whether the lock braking force has been already acting on the rear wheels 2RL and 2RR at the time when the lock braking force acts on the front wheels 2FL and 2FR as a determination as to a characteristic change resulting from an increase in the braking force distribution to the rear side. Typically, the ECU 7 determines that a fade state of the brake devices 11 of the front wheels 2FL and 2FR is occurring when the braking force by which the rear wheels 2RL and 2RR lock has been already acting on the rear wheels 2RL and 2RR of the vehicle 1 at the time when the braking force by which the front wheels 2FL and 2FR lock acts on the front wheels 2FL and 2FR of the vehicle 1. For example, the ECU 7 just needs to determine whether the lock braking force has been already acting on the rear wheels 2RL and 2RR at the time when the lock braking force acts on the front wheels 2FL and 2FR on the basis of whether any one of the wheel accelerations dvwRL and dvwRR becomes smaller than or equal to the predetermined acceleration Kc2 before any one of the wheel accelerations dvwFL and dvwFR becomes smaller than or equal to the predetermined acceleration Kc1. In this case as well, as described above, as a fade state of the brake devices 11 of the front wheels 2FL and 2FR is occurring and the actual braking force distribution to the rear side increases, the actual braking force distribution line L31 shifts to the actual braking force distribution line L32. Thus, the ECU 7 is able to determine that a fade state of the brake devices 11 of the front wheels 2FL and 2FR is occurring.

Furthermore, the ECU 7 may determine whether any one of the wheel speed variations of the front wheels 2FL and 2FR of the vehicle 1 is smaller than or equal to a predetermined variation, in other words, whether a variation in any one of the wheel accelerations takes a longer period of time than before, as a determination as to the time response of braking force. Typically, the ECU 7 determines that a fade state of the brake devices 11 of the front wheels 2FL and 2FR is occurring when any one of the wheel speed variations of the front wheels 2FL and 2FR is smaller than or equal to the predetermined variation. For example, the ECU 7 just needs to determine whether any one of the wheel speed variations of the front wheels 2FL and 2FR of the vehicle 1 is smaller than or equal to the predetermined variation on the basis of whether a period of time from when any one of the wheel accelerations dvwFL and dvwFR corresponding to the wheel speed variations of the front wheels 2FL and 2FR becomes larger than a predetermined determination acceleration A1 to when the any one of the wheel accelerations dvwFL and dvwFR becomes smaller than or equal to a determination acceleration B1 is longer than or equal to a predetermined period of time T1. The predetermined determination accelerations A1 and B1 and the predetermined period of time T1 are preset and stored in the storage unit on the basis of the specifications of various components of the vehicle 1, the braking force distribution line map, an actual vehicle evaluation, etc. In this case, because the rising of the braking force tends to be slow as brake fade occurs, the ECU 7 is able to determine that a fade state of the brake devices 11 of the front wheels 2FL and 2FR is occurring when any one of the wheel speed variations of the front wheels 2FL and 2FR is smaller than or equal to a predetermined variation.

In addition, the ECU 7 may determine whether a period of time from when braking operation of which the operation amount for braking the vehicle 1 is larger than or equal to a predetermined operation amount is performed to when ABS control is activated is longer than or equal to a predetermined period of time T2 as a determination as to the time response of braking force. Typically, the ECU 7 determines that a fade state of the brake devices 11 of the front wheels 2FL and 2FR is occurring when a period of time from when braking operation of which the operation amount for braking the vehicle 1 is larger than or equal to the predetermined operation amount is performed to when ABS control is activated is longer than or equal to the predetermined period of time T2. For example, ABS control is activated after the master cylinder pressure PMC becomes larger than a determination operation amount Kpmc, and the ECU 7 just needs to determine whether the period of time until ABS control is activated is longer than or equal to the predetermined period of time T2 on the basis of whether a period of time until the deceleration Gx of the vehicle 1 becomes larger than a predetermined determination deceleration KF1 is longer than or equal to the predetermined period of time T2. The determination operation amount Kpmc, the determination deceleration KF1 and the predetermined period of time T2 are preset and stored in the storage unit on the basis of the specifications of various components of the vehicle 1, the braking force distribution line map, an actual vehicle evaluation, etc. For example, the determination operation amount Kpmc may be the predetermined operation amount KFApmc. In this case as well, because the rising of the braking force tends to be slow as brake fade occurs, the ECU 7 is able to determine that a fade state of the brake devices 11 of the front wheels 2FL and 2FR is occurring when a period of time from when the braking operation of which the operation amount for braking the vehicle 1 is larger than or equal to the predetermined operation amount is performed to when ABS control is activated is longer than or equal to the predetermined period of time T2.

Then, when the ECU 7 determines that a fade state of the brake devices 11 of the front wheels 2FL and 2FR is occurring, the ECU 7, for example, incorporates the fade state into ABS control, or the like, corrects the amount of increase or decrease in brake pressure in ABS control on the basis of the fact that the fade state is occurring and adjusts the amount of increase and decrease in braking force. By so doing, the ECU 7 is able to suppress shortage of the amount of increase in brake pressure after brake pressure is decreased in ABS control under the fade state and is able to execute proper ABS control on the basis of whether the fade state is occurring.

Next, an example of control executed by the ECU 7 will be described with reference to the flow chart shown in FIG. 3. Note that the control routine is repeatedly executed at control cycles of several milliseconds to several tens of milliseconds.

First, the ECU 7 determines whether both the front wheels 2FL and 2FR each are in a state before being subjected to ABS control on the basis of the operating conditions, or the like, of the various components of the braking system 6, or the like (ST1). When the ECU 7 determines that at least any one of the front wheels 2FL and 2FR is subjected to ABS control (No in ST1), the ECU 7 ends the current control cycle and proceeds to the next control cycle.

When the ECU 7 determines that the front wheels 2FL and 2FR each are in a state before being subjected to ABS control (Yes in ST1), the ECU 7 determines whether the master cylinder pressure PMC is higher than or equal to the predetermined operation amount KFApmc and the master cylinder pressure differential value ΔPMC is larger than or equal to the predetermined operation speed KFADpmc on the basis of the detected result of the master cylinder pressure sensor 14 (ST2). When the ECU 7 determines that this determination condition is not satisfied (No in ST2), the ECU 7 ends the current control cycle and proceeds to the next control cycle.

When the ECU 7 determines that the master cylinder pressure PMC is higher than or equal to the predetermined operation amount KFApmc and the master cylinder pressure differential value ΔPMC is larger than the predetermined operation speed KFADpmc (Yes in ST2), the ECU 7 determines whether a period of time from when the master cylinder pressure PMC becomes higher than the determination operation amount Kpmc to when the deceleration Gx of the vehicle 1 becomes larger than the determination deceleration KF1 is longer than or equal to the predetermined period of time T2 on the basis of the detected result of the longitudinal acceleration sensor 13 and the detected result of the master cylinder pressure sensor 14 (ST3). When the ECU 7 determines that the determination condition is not satisfied (No in ST3), the ECU 7 ends the current control cycle and proceeds to the next control cycle.

When the ECU 7 determines that a period of time from when the master cylinder pressure PMC becomes higher than the determination operation amount Kpmc to when the deceleration Gx of the vehicle 1 becomes larger than the determination deceleration KF1 is longer than or equal to the predetermined period of time T2 (Yes in ST3), the ECU 7 determines whether the larger one of the wheel acceleration dvwFL and the wheel acceleration dvwFR is smaller than or equal to the predetermined acceleration Kc1 and the deceleration Gx of the vehicle 1 is larger than or equal to the predetermined deceleration KD1 or the larger one of the wheel acceleration dvwRL and the wheel acceleration dvwRR is smaller than or equal to the predetermined acceleration Kc2 and the deceleration Gx of the vehicle 1 is smaller than or equal to the predetermined deceleration KD1 on the basis of the detected results of the wheel speed sensors 12 and longitudinal acceleration sensor 13 (ST4). When the ECU 7 determines that the determination condition is not satisfied (No in ST4), the ECU 7 ends the current control cycle and proceeds to the next control cycle.

When the ECU 7 determines that the larger one of the wheel acceleration dvwFL and the wheel acceleration dvwFR is smaller than or equal to the predetermined acceleration Kc1 and the deceleration Gx of the vehicle 1 is larger than or equal to the predetermined deceleration KD1 or determines that the larger one of the wheel acceleration dvwRL and the wheel acceleration dvwRR is smaller than or equal to the predetermined acceleration Kc2 and the deceleration Gx of the vehicle 1 is smaller than or equal to the predetermined deceleration KD1 (Yes in ST4), the ECU 7 determines whether the deceleration Gx of the vehicle 1 is larger than or equal to the predetermined deceleration KD1 and the larger one of the slip amounts slipFR and slipFL of the front wheels 2FL and 2FR of the vehicle 1 is smaller than or equal to the predetermined slip amount Kc3 on the basis of the detected results of the wheel speed sensors 12 and longitudinal acceleration sensor 13 (ST5). When the ECU 7 determines that this determination condition is not satisfied (No in ST5), the ECU 7 ends the current control cycle and proceeds to the next control cycle.

When the ECU 7 determines that the deceleration Gx of the vehicle 1 is larger than or equal to the predetermined deceleration KD1 and the larger one of the slip amounts slipFR and slipFL of the front wheels 2FL and 2FR of the vehicle 1 is smaller than or equal to the predetermined slip amount Kc3 (Yes in ST5), the ECU 7 determines whether the larger one of the wheel acceleration dvwRL and the wheel acceleration dvwRR becomes smaller than or equal to the predetermined acceleration Kc2 before the larger one of the wheel acceleration dvwFL and the wheel acceleration dvwFR becomes smaller than the predetermined acceleration Kc1 on the basis of the detected results of the wheel speed sensors 12 (ST6). When the ECU 7 determines that this determination condition is not satisfied (No in ST6), the ECU 7 ends the current control cycle and proceeds to the next control cycle.

When the ECU 7 determines that the larger one of the wheel acceleration dvwRL and the wheel acceleration dvwRR becomes smaller than or equal to the predetermined acceleration Kc2 before the larger one of the wheel acceleration dvwFL and the wheel acceleration dvwFR becomes smaller than the predetermined acceleration Kc1 (Yes in ST6), the ECU 7 determines whether a period of time from when any one of the wheel acceleration dvwFL of the front wheel 2FL and the wheel acceleration dvwFR of the front wheel 2FR becomes larger than the predetermined determination acceleration A1 to when the any one of the wheel acceleration dvwFL of the front wheel 2FL and the wheel acceleration dvwFR of the front wheel 2FR becomes smaller than or equal to the predetermined determination acceleration B1 is longer than or equal to the predetermined period of time T1 on the basis of the detected results of the wheel speed sensors 12 (ST7). When the ECU 7 determines that this determination condition is not satisfied (No in ST7), the ECU 7 ends the current control cycle and proceeds to the next control cycle.

When the ECU 7 determines that a period of time from when any one of the wheel acceleration dvwFL of the front wheel 2FL and the wheel acceleration dvwFR of the front wheel 2FR becomes larger than the predetermined determination acceleration A1 to when the any one of the wheel acceleration dvwFL of the front wheel 2FL and the wheel acceleration dvwFR of the front wheel 2FR becomes smaller than or equal to the predetermined determination acceleration B1 is longer than or equal to the predetermined period of time T1 (Yes in ST7), the ECU 7 identifies that a fade state of any one of the brake devices 11 of the front wheels 2FL and 2FR is occurring (ST8), executes ABS control by correcting an ABS control amount, for example, the amount of increase or decrease in brake pressure, on the basis of the fact that the fade state is occurring (ST9), and then ends the current control cycle and proceeds to the next control cycle.

The ECU 7 makes the above determinations to thereby make it possible to accurately isolate a light vehicle weight (LVW) (light loaded state (during no load)) and a gross vehicle weight (GVW) (loaded state (during full load)) in a non-fade condition from a fade state as shown in FIG. 4. That is, the ECU 7 is able to remove the possibility of LVW in a non-fade condition through the determination of ST3, is able to remove the possibility of GVW in a non-fade condition through the determinations of ST4 and ST5 and is able to fix that a fade state of any one of the brake devices 11 is occurring through the determinations of ST6 and ST7.

The ECU 7 according to the above described embodiment determines whether a fade state of the brake devices 11 that brake the corresponding wheels 2 is occurring on the basis of the deceleration of the vehicle 1 and the slip amounts of the wheels 2 of the vehicle 1. Thus, the ECU 7 is able to easily improve the accuracy of a brake fade determination using, for example, the detected results of the sensors (the master cylinder pressure, the vehicle body deceleration and the wheel speeds) used in the existing control, and is able to properly determine whether a fade state of the brake devices is occurring.

The braking system 6 according to the above described embodiment includes: the brake devices 11 that are able to adjust braking forces that respectively act the corresponding wheels 2 of the vehicle 1; and the ECU 7 that controls the braking forces to control slip conditions of the wheels 2. The ECU 7 determines whether a fade state of any one of the brake devices 11 is occurring on the basis of the deceleration of the vehicle 1 and the slip amounts of the wheels 2, and adjusts the amount of increase or decrease in braking force on the basis of whether the fade state is occurring. Thus, the braking system 6 is able to properly determine whether a fade state of any one of the brake devices is occurring, and is able to properly execute ABS control on the basis of whether the fade state is occurring. By so doing, the ABS efficiency in a fade state is improved to thereby make it possible to reduce the stopping distance of the vehicle 1.

Note that the above described brake fade determination device, brake fade determination method and braking system according to the aspects of the invention are not limited to the configurations described in the above embodiment; various modifications are possible within the scope of the appended claims.

In the above description, the brake fade determination device and the controller of the braking system are implemented as the ECU that controls the various components of the vehicle; however, the brake fade determination device and the controller of the braking system are not limited to this configuration. For example, the brake fade determination device and the controller of the braking system may be configured separately from the ECU and may be configured to exchange detected signals, driving signals, and information, such as control commands, with the ECU.

In addition, in the above description, the braking operation amount is the master cylinder pressure; however, the braking operation amount is not limited to this configuration. For example, the braking operation amount may be the brake depression amount (pedal stroke) of the brake pedal 5, a pedal depression force on the brake pedal 5, or the like.

In addition, in the above description, a determination is made by combining a plurality of characteristic changes to thereby accurately determine whether a fade state of any one of the brake devices is occurring; instead, all the determination conditions may not be satisfied, for example, a fade state may be determined only through the determination of ST5. Even in this case as well, the brake fade determination device is able to further easily properly determine whether a fade state of any one of the brake devices is occurring.

The invention claimed is:

1. A brake fade determination device comprising:
   an electronic control unit configured to determine whether a fade state of a brake device that brakes a wheel of a vehicle is occurring on the basis of a deceleration of the vehicle and a slip amount of the wheel of the vehicle,
   wherein the fade state is a state where a coefficient of friction of the brake device decreases, and
   wherein the electronic control unit determines that the fade state is occurring in the case where the slip amount of a front wheel of the vehicle is smaller than or equal to a predetermined slip amount that corresponds to a lock state of the front wheel when the deceleration of the vehicle is a first constant predetermined deceleration.

2. The brake fade determination device according to claim 1, wherein
   the electronic control unit determines whether the fade state is occurring when an operation amount for braking the vehicle is larger than or equal to a predetermined operation amount and an operation speed for braking the vehicle is higher than a predetermined operation speed.

3. The brake fade determination device according to claim 2, wherein
   the electronic control unit determines that the fade state is occurring when a period of time from when braking operation of which the operation amount for braking the vehicle is larger than or equal to the predetermined operation amount is performed to when ABS control is activated is longer than or equal to a predetermined period of time.

4. The brake fade determination device according to claim 1, wherein
   the electronic control unit determines that the fade state is occurring when the deceleration of the vehicle at the time when a braking force by which a front wheel of the vehicle locks acts on the front wheel is larger than or equal to a second constant predetermined deceleration.

5. The brake fade determination device according to claim 1, wherein
   the electronic control unit determines that the fade state is occurring when the deceleration of the vehicle at the time when a braking force by which a rear wheel of the vehicle locks acts on the rear wheel is smaller than or equal to a third constant predetermined deceleration.

6. The brake fade determination device according to claim 1, wherein the electronic control unit determines that the fade state is occurring when a braking force by which a rear wheel of the vehicle locks has been already acting on the rear wheel at the time when a braking force by which a front wheel of the vehicle locks acts on the front wheel.

7. The brake fade determination device according to claim 1, wherein
the electronic control unit determines that the fade state is occurring when a wheel speed variation of a front wheel of the vehicle is smaller than or equal to a predetermined variation.

8. The brake fade determination device according to claim 1, wherein
the electronic control unit corrects an amount of braking force of the brake device when the fade state is determined.

9. The brake fade determination device according to claim 1, wherein
the electronic control unit corrects an amount of increase or decrease of hydraulic pressure of the brake device when the fade state is determined.

10. A brake fade determination method comprising:
determining with an electronic control unit whether a fade state of a brake device that brakes a wheel of a vehicle is occurring on the basis of a deceleration of the vehicle and a slip amount of the wheel of the vehicle,
wherein the fade state is a state where a coefficient of friction of the brake device decreases, and
wherein it is determined that the fade state is occurring in the case where the slip amount of a front wheel of the vehicle is smaller than or equal to a predetermined slip amount that corresponds to a lock state of the front wheel when the deceleration of the vehicle is a first constant predetermined deceleration.

11. The brake fade determination method according to claim 10, wherein
the electronic control unit determines whether the fade state is occurring when an operation amount for braking the vehicle is larger than or equal to a predetermined operation amount and an operation speed for braking the vehicle is higher than a predetermined operation speed.

12. The brake fade determination method according to claim 11, wherein
the electronic control unit determines that the fade state is occurring when a period of time from when braking operation of which the operation amount for braking the vehicle is larger than or equal to the predetermined operation amount is performed to when ABS control is activated is longer than or equal to a predetermined period of time.

13. The brake fade determination method according to claim 10, wherein
the electronic control unit determines that the fade state is occurring when the deceleration of the vehicle at the time when a braking force by which a front wheel of the vehicle locks acts on the front wheel is larger than or equal to a second constant predetermined deceleration.

14. The brake fade determination method according to claim 10, wherein
the electronic control unit determines that the fade state is occurring when a braking force by which a rear wheel of the vehicle locks has been already acting on the rear wheel at the time when a braking force by which a front wheel of the vehicle locks acts on the front wheel.

15. The brake fade determination method according to claim 10, wherein
the electronic control unit determines that the fade state is occurring when a wheel speed variation of a front wheel of the vehicle is smaller than or equal to a predetermined variation.

16. The brake fade determination method according to claim 10, wherein
the electronic control unit determines that the fade state is occurring when a period of time from when braking operation of which the operation amount for braking the vehicle is larger than or equal to the predetermined operation amount is performed to when ABS control is activated is longer than or equal to a predetermined period of time.

17. A braking system comprising:
a brake device that is able to adjust a braking force that acts on a wheel of a vehicle; and
a controller that controls the braking force to control a slip condition of the wheel, wherein
the controller determines whether a fade state of the brake device is occurring on the basis of a deceleration of the vehicle and a slip amount of the wheel, determines that the fade state is occurring in the case where the slip amount of a front wheel of the vehicle is smaller than or equal to a predetermined slip amount that corresponds to a lock state of the front wheel when the deceleration of the vehicle is a first constant predetermined deceleration, and adjusts an amount of increase or decrease in the braking force on the basis of whether the fade state is occurring,
wherein the fade state is a state where a coefficient of friction of the brake device decreases.

* * * * *